(12) United States Patent
Paoli et al.

(10) Patent No.: US 7,342,506 B2
(45) Date of Patent: Mar. 11, 2008

(54) WIRELESS REMOTE MONITORING SYSTEM

(75) Inventors: Ernie R. Paoli, Loveland, CO (US); Timothy A. Higgins, Ft. Collins, CO (US); David L. Rick, Longmont, CO (US)

(73) Assignee: Hach Company, Loveland, CO (US)

( * ) Notice: Subject to any disclaimer, the term of this patent is extended or adjusted under 35 U.S.C. 154(b) by 480 days.

(21) Appl. No.: 10/857,710

(22) Filed: May 29, 2004

(65) Prior Publication Data

US 2004/0239523 A1 Dec. 2, 2004

Related U.S. Application Data

(60) Provisional application No. 60/474,966, filed on Jun. 2, 2003.

(51) Int. Cl.
*G08B 23/00* (2006.01)

(52) U.S. Cl. .......................... 340/870.02; 340/870.01; 340/870.03; 340/870.16; 340/539.1; 340/825.69; 703/13; 703/14; 703/21

(58) Field of Classification Search ........... 340/870.01, 340/870.02, 870.03, 870.06, 870.08, 870.2, 340/870.29, 825.69, 539.1, 870.16, 879.02; 703/13, 14, 21; 370/327, 328
See application file for complete search history.

(56) References Cited

U.S. PATENT DOCUMENTS

| | | | | |
|---|---|---|---|---|
| 5,608,171 | A * | 3/1997 | Hunter et al. | 73/861.63 |
| 6,150,955 | A * | 11/2000 | Tracy et al. | 340/870.02 |
| 6,650,249 | B2 * | 11/2003 | Meyer et al. | 340/870.28 |
| 6,798,184 | B2 * | 9/2004 | Honda | 324/71.5 |
| 7,039,529 | B2 * | 5/2006 | Keech | 702/45 |
| 2001/0033567 | A1 * | 10/2001 | Frati | |

* cited by examiner

*Primary Examiner*—Hung Nguyen
(74) *Attorney, Agent, or Firm*—The Ollila Law Group LLC

(57) ABSTRACT

A remote monitoring system is described which enables monitoring of flow meters or other scientific instruments from a remote location using the GSM cellular phone network. The system includes a wireless modem utilizing the GSM cellular phone network, a central processing unit, connection of a scientific instrument to the central processing unit, power supply (e.g. one or more batteries), and an enclosure for housing the components.

22 Claims, 6 Drawing Sheets

WIRELESS REMOTE MONITORING SYSTEM

CROSS-REFERENCE TO RELATED APPLICATION

This application is based upon, and claims priority from, our Provisional Application No. 60/474,966, filed Jun. 2, 2003.

FIELD OF THE INVENTION

This invention relates to monitoring systems. More particularly, it relates to systems for monitoring and controlling flow meters and other scientific instruments from a remote location.

BACKGROUND OF THE INVENTION

Flow meters and other scientific instruments are widely used in many remote locations for a variety of purposes (e.g. to monitor flow rates of water in sewer systems). It is necessary for workmen to physically visit the remote sites to monitor the flow meters or other instruments (e.g. samplers) to gather data. Multiple site visits in numerous locations is a challenging, labor intensive, and expensive task. Ensuring that each site is operational and that maintenance is regularly scheduled is necessary to guarantee accurate and reliable data.

There has not heretofore been provided a system having the features described in the present application for wireless remote monitoring of flow meters or other scientific instruments.

SUMMARY OF THE INVENTION

In accordance with the present invention there is provided a wireless remote monitoring system which enables a person to collect data from and monitor the status of flow meters and scientific instruments in remote locations by means of the GSM cellular telephone network using a modem connected to a personal computer.

In one embodiment, the monitoring system comprises:
 (a) a wireless modem utilizing the GSM cellular phone network;
 (b) a CPU (central processing unit) operatively connected to the modem;
 (c) means for connecting a scientific instrument to said central processing unit;
 (d) power supply means for providing electrical power to said modem and said central processing unit; and
 (e) enclosure means for housing the components at the remote location.

A flow meter or other scientific instrument is normally operably connected to the CPU such that data from the flow meter or scientific instrument is transmitted to the modem where it can be accessed from a remote location through the GSM cellular phone network.

Other features and advantages of the remote monitoring system of the invention will be apparent from the following detailed description and accompanying drawings.

DETAILED DESCRIPTION OF THE INVENTION

Figure 1:
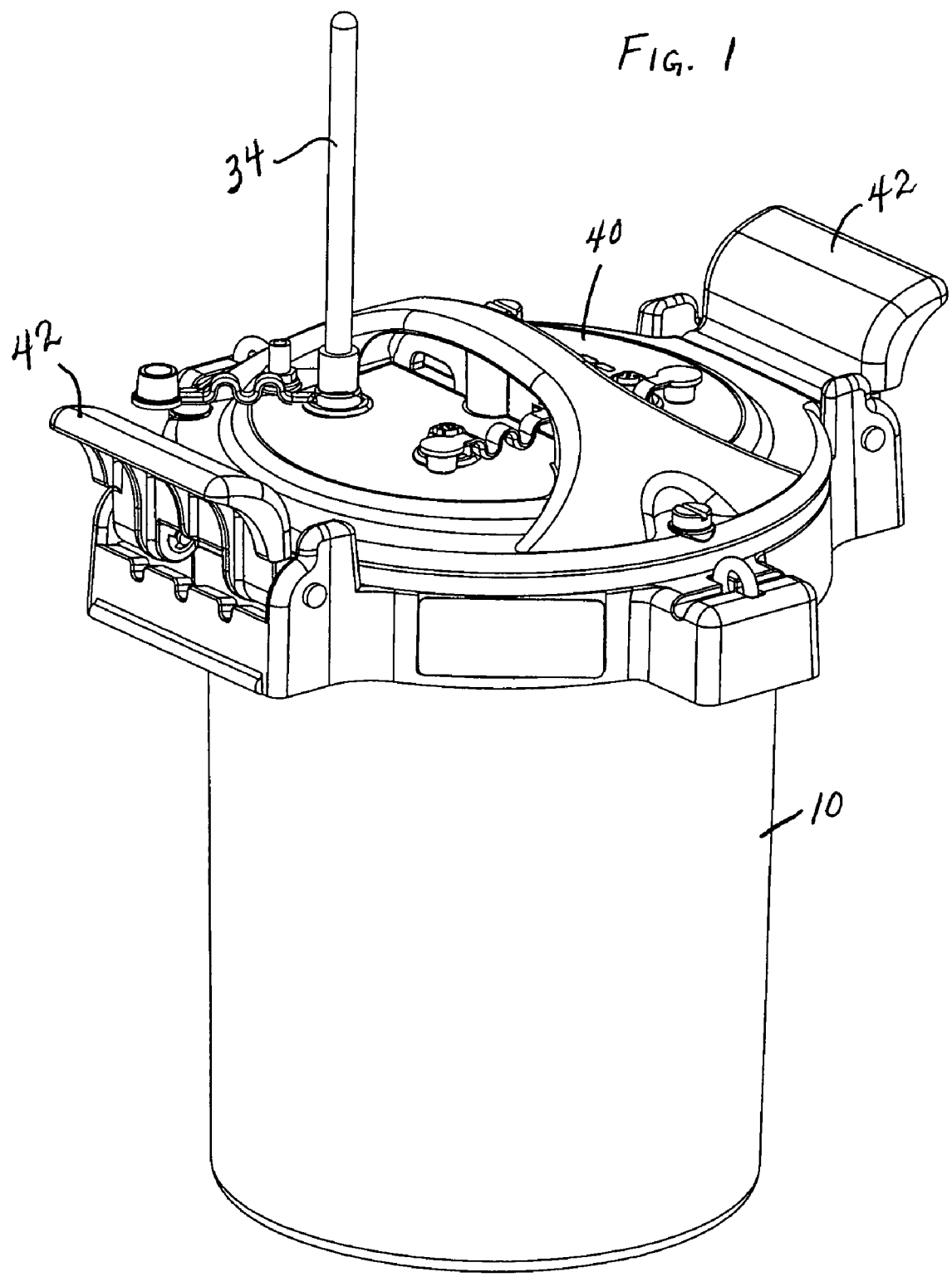
FIG. 1 is a perspective view of the enclosure which houses the components of the monitoring system at the remote location.
Figure 2:
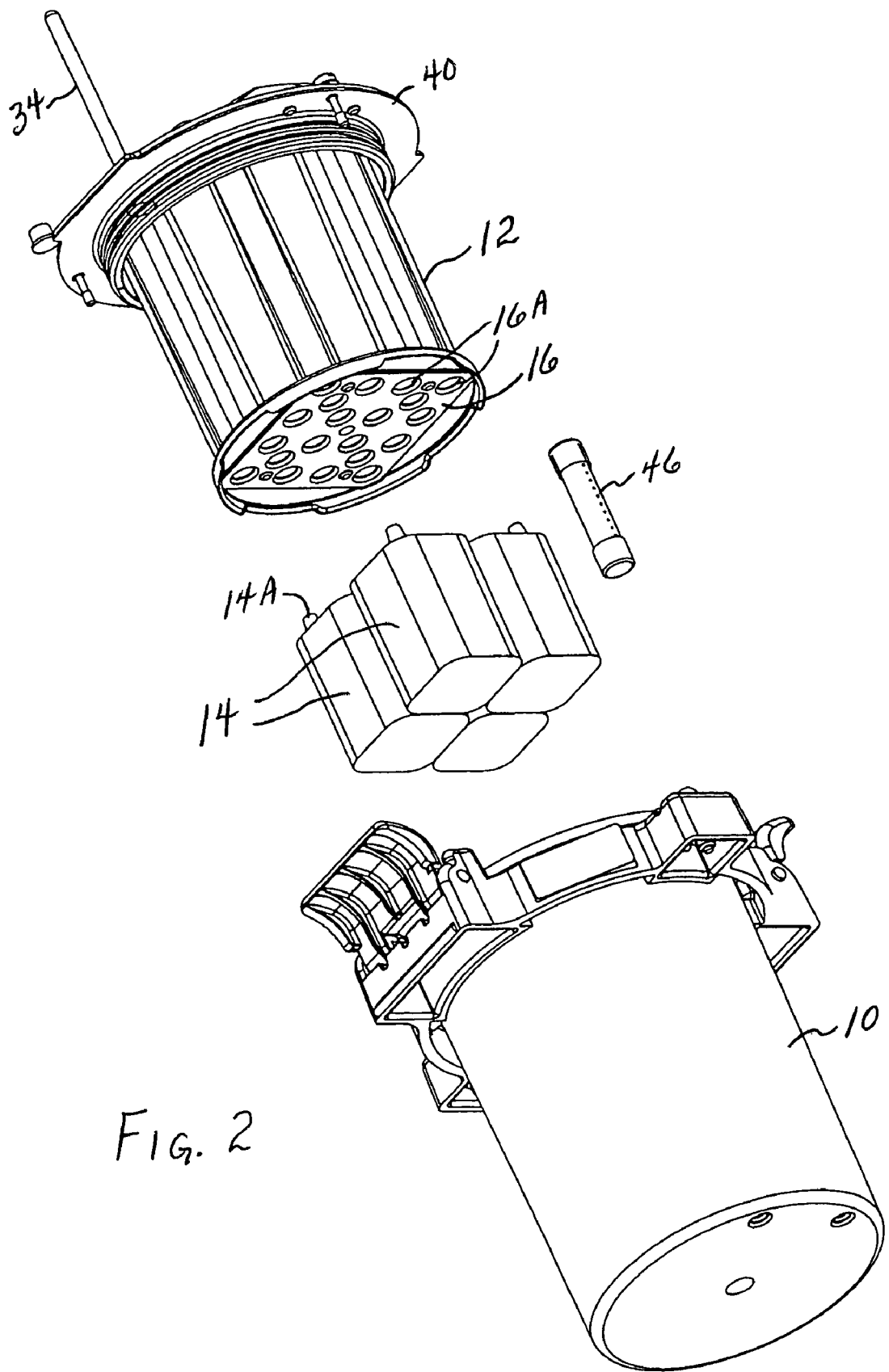
FIG. 2 is an exploded view of the enclosure showing inner and outer housing sections, batteries and dessicant cartridge.
Figure 3:
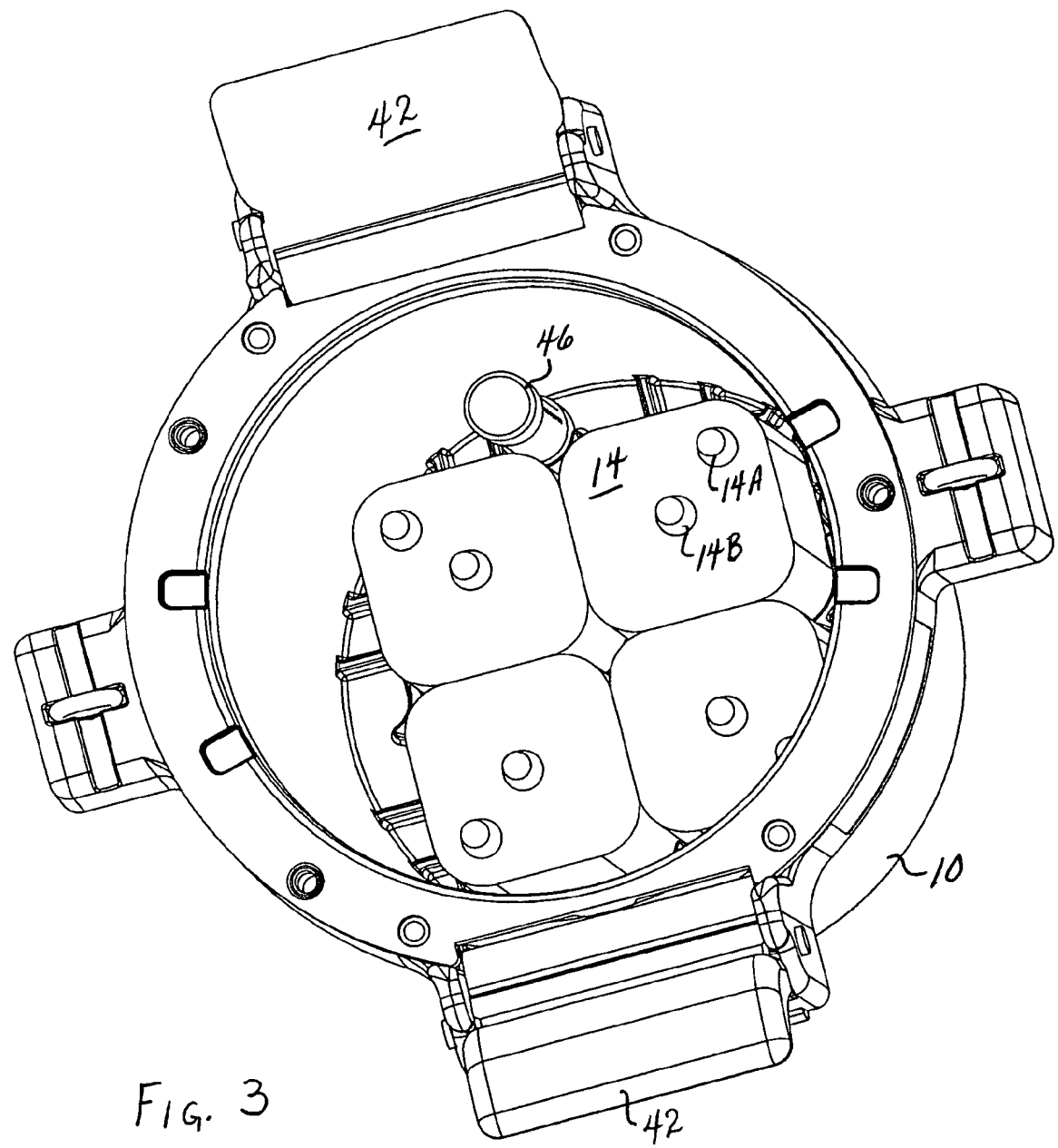
FIG. 3 is a top perspective view of the outer housing showing batteries positioned therein.
Figure 5:
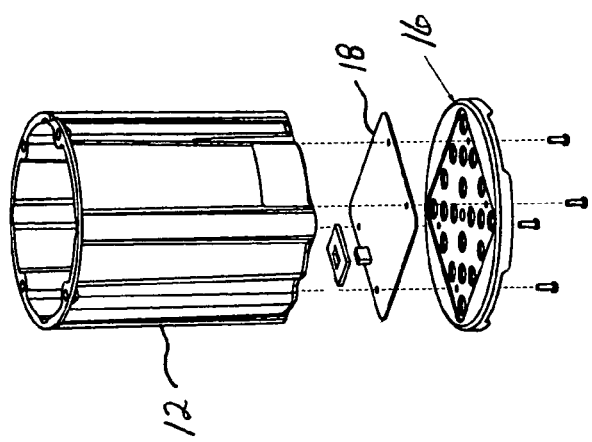
FIGS. 4 & 5 are exploded views of the inner module or housing section and its components.
Figure 4:
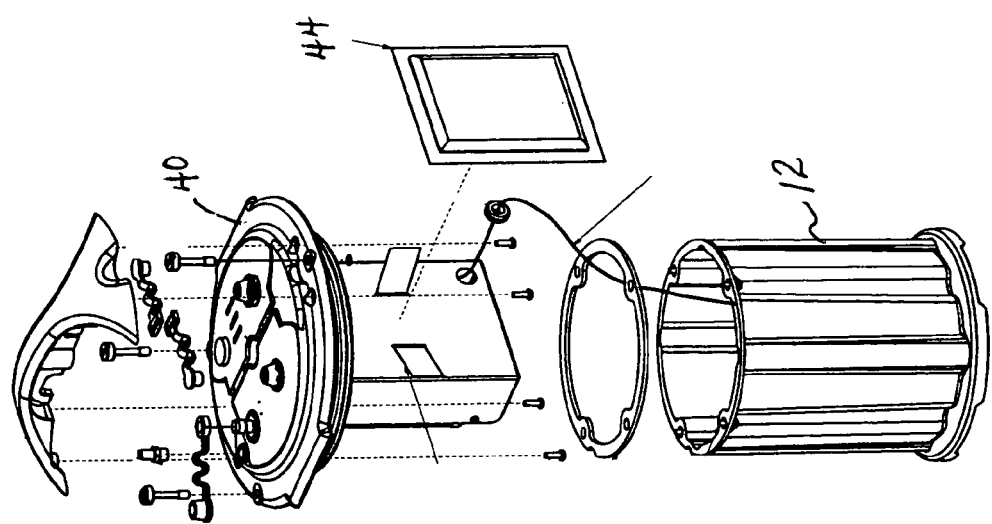
Figure 6:
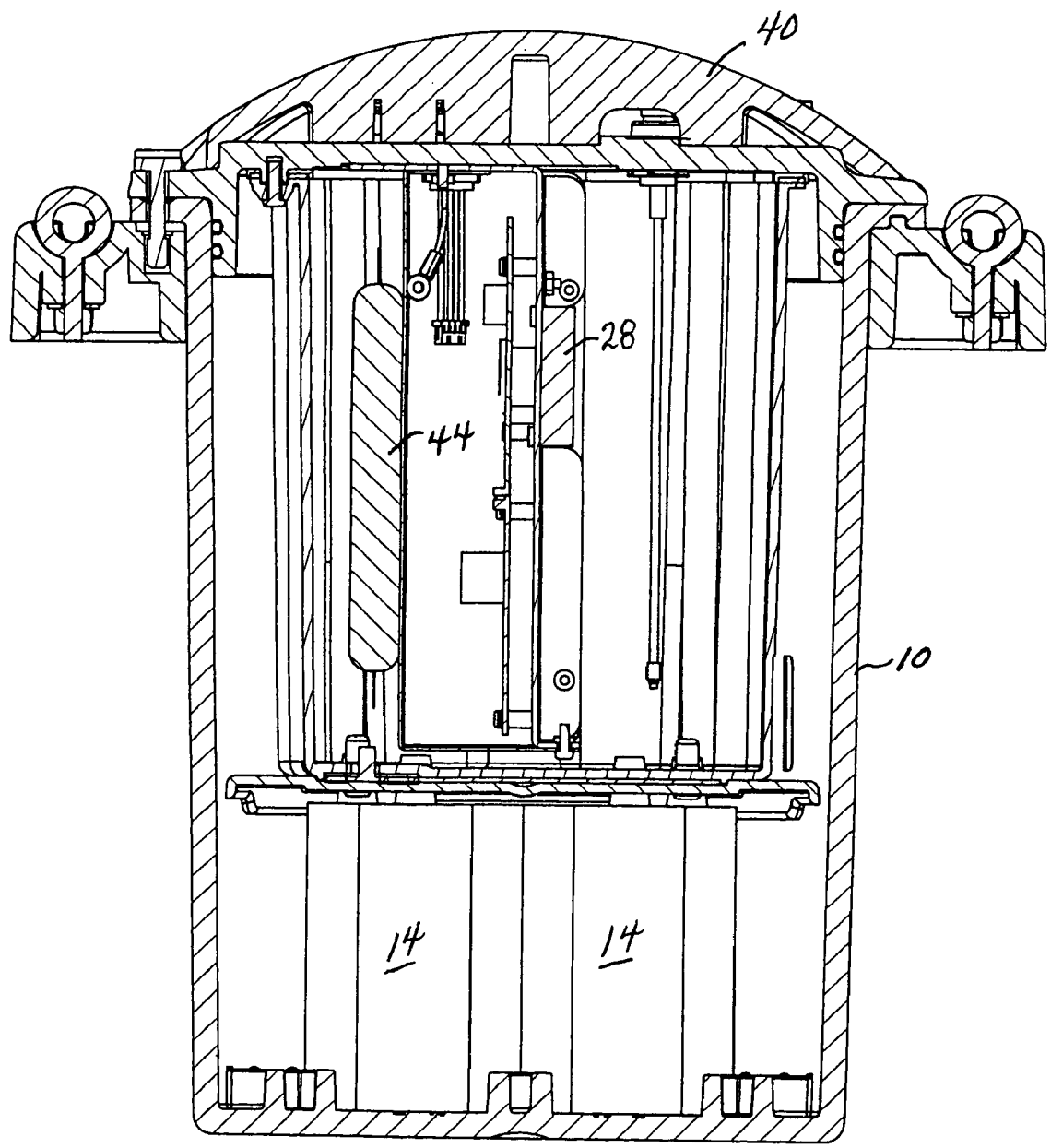
FIG. 6 is a cross-sectional view of the monitoring system of the invention.
Figure 7:
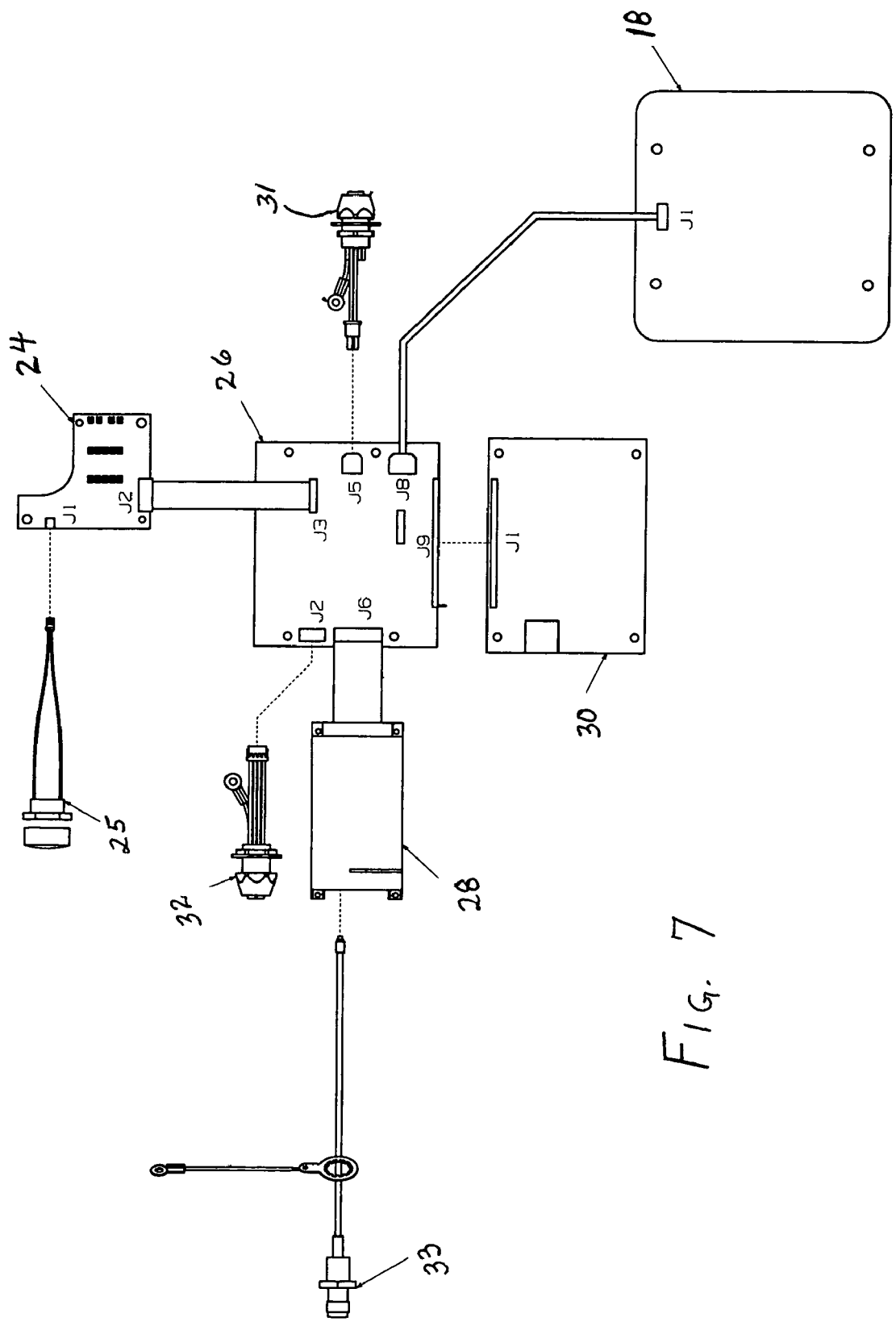
FIG. 7 is a schematic diagram showing the components included within the inner module of the system.

In the drawings there is shown a preferred embodiment of the wireless remote monitoring system of the invention. Preferably there is an outer housing section 10 and an inner housing section or module 12 which fits within the outer housing. The purpose of the inner housing section is to protect the electronics when the outer housing is opened for battery replacement.

Batteries 14 are contained within the outer housing section and include upwardly projecting terminals 14A and 14B. The negative terminal 14B is located in the center of each battery. The bottom of the inner housing section 12 includes a plate 16 with a plurality of openings 16A through which the battery terminals may project in order to make electrical contact with a battery board 18. The battery board facilitates interconnection of the four alkaline 6V batteries to the wireless GSM cellular modem 28 and the central processing unit 30. Of course, instead of using batteries, it is possible to use external auxiliary power, if available.

The monitoring system may optionally include an LED board 24 and user interface selection switch 25, useful when performing diagnostic procedures. It may also be useful for displaying signal quality, battery voltage, and communication activity. The LED board connects to a power supply and interconnect board 26 via a 10-pin ribbon cable.

Board 26 provides regulated power to the modem 28 (e.g. Motorola G18) and the LED board 24 and it interfaces data and handshaking lines from the CPU board 30 with modem 28 and LED board 24. The modem power supply on board 26 accommodates both very low sleep currents and very high peak currents of the modem to maximize battery life. It changes operating modes automatically, by sensing the current used by the modem. Board 26 handles the power source switching between internal batteries and an optional external power source. It is connected to the CPU board 30 via a 2×50 pin I/O connector. The CPU board 30 executes the firmware instructions to coordinate bi-directional communications between the GSM cellular phone network and the instrument interface connector 32 to a flow meter or other desired scientific instrument. In addition, it handles the modem application protocol, the instrument protocols, and power management.

The modem (e.g. Motorola G18 GSM/GPRS) provides the radio-frequency link between the monitoring system and the GSM wireless phone network. This link is accomplished via circuit-switched, mobile-terminated connection. The modem connects to an external antenna (e.g. antenna 34) via connector 33. A variety of different types of antennas could be used, e.g. half-wave, high gain and low-profile. The antenna may be placed on a pole, or in the pavement, or elsewhere so long as it is at or above the surface of the ground.

The design of the battery board 18 is such that the orientation of each battery in the outer housing section is irrelevant. In other words, with the center terminal of each battery being negative, and the positive terminal being located at a corner of the battery, the positive terminal can have only four possible locations in the housing. The battery board includes appropriate contacts such that no matter in which location the positive terminal is for each battery, appropriate electrical contact is made between each battery and the board 18.

The remote monitoring system of the invention provides radio-frequency communications and data collection between scientific instruments and the GSM cellular network. It allows a user to collect data from and monitor the status of flow meters and samplers in remote locations and receive email and text message notification of alarm conditions. The user may contact the monitoring system, and thereby the flow meter or sampler, through the telephone network using a wireless or wired modem connected to a personal computer. The monitoring system connects to the flow meter or sampler via an RS-232 cable using robust, environmentally strong, custom connectors. The system is optionally powered from internal batteries, external auxiliary power, or both. The system provides power management to exceed 180 days of operation using four internal alkaline batteries. Alarming is accomplished using the Motorola G18 GSM/SMS technology to transmit site information from the system to either an internet email address and/or mobile phones supporting text messaging. The monitoring system wakes from its low power state, on a predefined interval, to query the flow meter or sampler for measurement data. This measurement data is used by the system to determine if a predefined alarm condition exists and, if so, compile site condition information into an alarm report. The remote monitoring system is useful, for example, in municipal wastewater plants, flow service providers, etc. where it is necessary or desirable to access data quickly and efficiently from remote locations. This is important, for example, in water monitoring and flow measurements. Examples of typical data which can be gathered include continuous rainfall measurement, continuous flow measurement, storm water monitoring, velocity, water quality, etc.

As shown in the drawings, a lid or cover member 40 is secured to the upper end or top of the inner housing section. A gasket is located between the cover and the inner housing. A pair of pivotable levers 42 attached to the upper end of the outer housing are useful for prying the inner housing section and the cover member off the outer housing section to enable the batteries to be replaced, when necessary. The cover member preferably includes three connectors extending through it (external power connector, an instrument interface connector, and the antenna connector). A Schrader valve may also be included in the cover to enable the internal pressure to be equilibrated with the atmosphere.

Other variants are possible without departing from the scope of this invention. For example, a dessicant bag 44 may be included in the inner housing section to absorb moisture. Also, a dessicant cartridge 46 may be included in the outer housing section to absorb moisture.

What is claimed is:

1. A wireless remote monitoring system comprising:
   (a) a wireless modem utilizing a GSM cell phone network;
   (b) a central processing unit operatively connected to said wireless modem;
   (c) means for connecting a scientific instrument to said central processing unit;
   (d) power supply means for providing electrical power to said wireless modem and said central processing unit;
   (e) means for automatically changing operating modes of said power supply means by sensing a current used by said wireless modem; and
   (f) enclosure means for enclosing said modem and central processing unit.

2. The monitoring system of claim 1, wherein said power supply means comprises at least one battery.

3. The monitoring system of claim 1, further comprising an antenna operatively connected to said wireless modem.

4. The monitoring system of claim 1, wherein said enclosure means comprises first and second housings; wherein said second housing is adapted to fit within said first housing; and wherein said wireless modem and said central processing unit are contained within said second housing.

5. The monitoring system of claim 4, wherein said power supply means comprises a plurality of batteries contained within said first housing; and wherein said batteries are operatively connected to said wireless modem and central processing unit in said second housing.

6. The monitoring system of claim 5, wherein said batteries include upwardly projecting terminals; and wherein said second housing includes openings enabling said terminals of said batteries to extend through said openings.

7. The monitoring system of claim 4, further comprising an antenna operatively connected to said wireless modem and extending upwardly out of said second housing.

8. The monitoring system of claim 1, wherein said power supply means comprises an external power source.

9. The monitoring system of claim 1, wherein said scientific instrument comprises a flow meter.

10. The monitoring system of claim 1, wherein said scientific instrument comprises a sampler.

11. A wireless remote monitoring system comprising:
    (a) a wireless modem utilizing a GSM cell phone network;
    (b) antenna means operatively connected to said wireless modem;
    (c) a central processing unit operatively connected to said wireless modem;
    (d) means for connecting a flow meter to said central processing unit;
    (e) power supply means for providing electrical power to said wireless modem and said central processing unit;
    (f) enclosure means for enclosing said wireless modem and said central processing unit; and
    (g) a modem power supply, which automatically changes operating modes to accommodate both low currents and high currents of said wireless modem, wherein said modem power supply automatically changes operating modes by sensing a current used by said wireless modem.

12. The monitoring system of claim 11, wherein said power supply means comprises at least one battery.

13. The monitoring system of claim 11, wherein said enclosure means comprises first and second housings; wherein said second housing is adapted to fit within said first housing; and wherein said wireless modem and said central processing unit are contained within said second housing.

14. The monitoring system of claim 13, wherein said power supply means comprises a plurality of batteries contained within said first housing; and wherein said batteries are operatively connected to said wireless modem and central processing unit in said second housing.

15. The monitoring system of claim 14, wherein said batteries include upwardly projecting terminals; and wherein said second housing includes openings enabling said terminals of said batteries to extend through said openings.

16. The monitoring system of claim 11, further comprising a means for automatically changing operating modes of said power supply means by sensing the current used by said wireless modem.

17. A wireless remote monitoring system comprising:
(a) a wireless modem utilizing a GSM cell phone network;
(b) antenna means operatively connected to said wireless modem;
(c) a central processing unit operatively connected to said wireless modem;
(d) means for connecting a sampler to said central processing unit;
(e) power supply means for providing electrical power to said wireless modem and said central processing unit;
(f) enclosure means for enclosing said wireless modem and said central processing unit; and
(g) a modem power supply, which automatically changes operating modes to accommodate both low currents and high currents of said wireless modem, wherein said modem power supply automatically changes operating modes by sensing a current used by said wireless modem.

18. The monitoring system of claim 17, wherein said power supply means comprises at least one battery.

19. The monitoring system of claim 17, wherein said enclosure means comprises first and second housings; wherein said second housing is adapted to fit within said first housing; and wherein said wireless modem and said central processing unit are contained within said second housing.

20. The monitoring system of claim 19, wherein said power supply means comprises a plurality of batteries contained within said first housing; and wherein said batteries are operatively connected to said wireless modem and central processing unit in said second housing.

21. The monitoring system of claim 20, wherein said batteries include upwardly projecting terminals; and wherein said second housing includes openings enabling said terminals of said batteries to extend through said openings.

22. The monitoring system of claim 17, further comprising a means for automatically changing operating modes of said power supply means by sensing the current used by said wireless modem.

* * * * *